(12) United States Patent
Schneider (10) Patent No.: US 7,995,765 B2
(45) Date of Patent: Aug. 9, 2011

(54) SHARING A SECRET USING HYPERPLANES OVER GF(Q)

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 454 days.

(21) Appl. No.: 12/200,897

(22) Filed: Aug. 28, 2008

(65) Prior Publication Data

US 2010/0054457 A1    Mar. 4, 2010

(51) Int. Cl.
*H04L 9/00* (2006.01)
(52) U.S. Cl. ............. 380/278; 380/277; 380/279
(58) Field of Classification Search ........... 380/277–279
See application file for complete search history.

(56) References Cited

U.S. PATENT DOCUMENTS

| | | | | |
|---|---|---|---|---|
| 2002/0032866 | A1* | 3/2002 | Suga | 713/180 |
| 2003/0081785 | A1* | 5/2003 | Boneh et al. | 380/277 |
| 2004/0025018 | A1* | 2/2004 | Haas et al. | 713/168 |
| 2004/0103276 | A1* | 5/2004 | Jing et al. | 713/156 |
| 2004/0179686 | A1* | 9/2004 | Matsumura et al. | 380/44 |
| 2005/0053045 | A1* | 3/2005 | Chmora et al. | 370/338 |
| 2008/0232580 | A1* | 9/2008 | Hosaka et al. | 380/28 |
| 2009/0144543 | A1* | 6/2009 | Fujii et al. | 713/160 |
| 2010/0008505 | A1* | 1/2010 | Bai | 380/255 |

FOREIGN PATENT DOCUMENTS

JP    2008233823 A * 10/2008

OTHER PUBLICATIONS

Schneier, Bruce, "Applied Cryptography, Second Edition—Protocols, Algorithms and Source Code in C", © 1996, John Wiley & Sons, Inc., title pages, pp. viii and 47-74.
Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference, 1979, AFIPS—Conference Proceedings*, vol. 48, AFIPS Press, Montvale, NJ 07645, pp. 313-317.
Blakley, G. R. et al., "Security of Ramp Schemes", *Lecture Notes in Computer Science—Advances in Cryptology, Proceedings of CRYPTO 84*, Springer-Verlag, pp. 242-268.
Shamir, Adi et al., "How to Share a Secret", *Programming Techniques, Communications of the ACM*, Nov. 1979, vol. 22, No. 11, pp. 612-613.

* cited by examiner

*Primary Examiner* — Nasser Moazzami
*Assistant Examiner* — Lisa Lewis
(74) *Attorney, Agent, or Firm* — Lowenstein Sandler PC (57) ABSTRACT

A method and system distributes N shares of a secret among cooperating entities using hyperplanes over GF(q), such that the secret can be reconstructed from K of the N shares (where $K \leq N$). In one embodiment, the method constructs a K-tuple that contains the secret and elements of GF(q), where q is a power m of an odd prime p. The method further multiplies the K-tuple by a matrix of size (N×K) to produce an N-tuple using arithmetic defined on GF(q). Thus, N shares of the secret are generated, with each of the N shares including a component of the N-tuple.

13 Claims, 8 Drawing Sheets

AN ALTERNATIVE METHOD FOR GENERATING
AN (N X K) MATRIX OF RANK K

FIG. 6

MATRIX CONVERSION FOR SECRET RECONSTRUCTION

SHARING A SECRET USING HYPERPLANES OVER GF(Q)

TECHNICAL FIELD

Embodiments of the present invention relate to cryptographic techniques, and more specifically, to sharing a secret among cooperating parties.

CROSS-REFERENCE TO RELATED APPLICATIONS

The present application is related to U.S. Application Ser. No. 12/200,895, filed Aug. 28, 2008, currently pending, and U.S. Application Ser. No. 12/200,896, filed Aug. 28, 2008, currently pending, which are assigned to the same assignee as the present application.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the share are lost or when some of the share holders are absent.

In general, known secret sharing techniques are defined in the integer ring, which involve manipulation of integers of large sizes. Large integers are not suitable for computer operations. Thus, there is a need to develop a secret sharing technique that overcomes the above inherent limitation of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system distributes N shares of a secret among cooperating entities using hyperplanes over $GF(q)$, such that the secret can be reconstructed from K of the N shares (where $K \leq N$). In one embodiment, the method constructs a K-tuple that contains the secret and elements of $GF(q)$, where q is a power m of an odd prime p. The method further multiplies the K-tuple by a matrix of size ($N \times K$) to produce an N-tuple using arithmetic defined on $GF(q)$. Thus, N shares of the secret are generated, with each of the N shares including a component of the N-tuple.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "representing", "embedding", "generating", "extending", "multiplying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
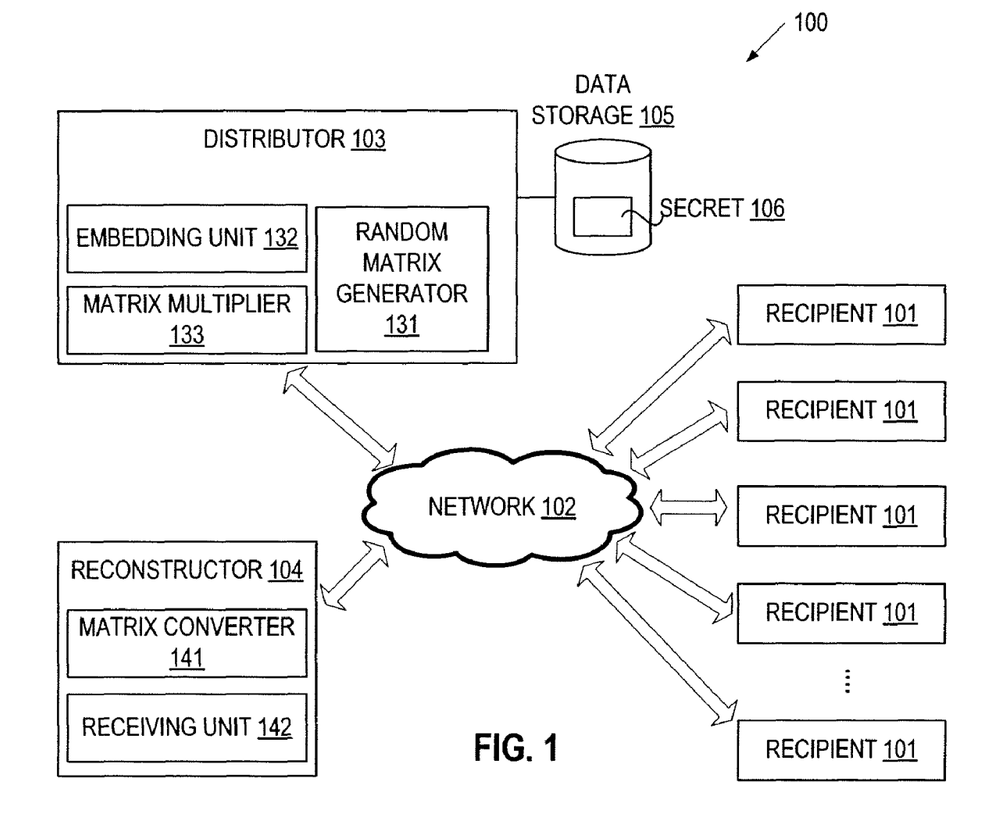
FIG. 1 illustrates a network architecture in which embodiments of the present invention may be implemented.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret data to be jointly held in escrow by the recipients 101.

The secret 106 may be a number, a bit string, an ASCII coded text or other representations that can be converted into a sequence of numbers, with each number an element of $GF(p)$, where p is a prime number. This number sequence is an element of $GF(q)$ (where $q=p^m$), which is a field that contains a plurality of number sequences, with each sequence having m elements of $GF(p)$. In polynomial notation, such a number sequence can be represented as a polynomial having m coefficients in $GF(p)$. The polynomial is referred to as a polynomial over $GF(p)$ and has its arithmetic defined on $GF(q)$. The factor "m" herein is selected to be large enough to represent the secret 106, e.g., at least as large as the length of the sequence of numbers that represents the secret 106. For example, if the secret is a 256-bit bulk cipher key, and p=89, the degree m is at least 40, and the 256-bit secret can be represented $39^{th}$ degree polynomial with coefficients in $GF(89)$.

To safeguard the secret 106, the distributor 103 generates a plurality of shares of the secret 106 and distributes one or more shares to each of the recipients 101 through the network 102. The secret 106 can be reconstructed from a subset of the distributed shares. In one embodiment, the cryptosystem 100 also includes a reconstructor 104 to reconstruct the secret 106 using the distributed shares. The reconstructor 104 collects the received shares of the secret to form a matrix, and converts part of the matrix into an identity matrix. The original secret can be extracted from the remaining portion of the converted matrix. A person of ordinary skill in the art would appreciate that the reconstructor 104 may be a separate computing system as shown in FIG. 1, or, alternatively, reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the distributor 103 includes a random matrix generator 131, an embedding unit 132, and a matrix multiplier 133 to generate the shares. The reconstructor 104 includes a receiving unit 142 to collect shares of the secret 106 from the recipients 101, and a matrix converter 141 to reconstruct the secret 106 from the collected shares. Each of the random matrix generator 131, the embedding unit 132, the matrix multiplier 133, and the matrix converter 141 includes arithmetic processing units, such as adders, multipliers, random element generators, subtractors, etc., as well as memory circuitry, such as registers, RAM, etc., to perform mathematical calculations. The functions of these components will be described in greater detail below in connection with FIGS. 2-7.

In one embodiment, the distributor 103 distributes the shares of the secret to the recipients 101 using a transport-safe coding. An embodiment of the transport-safe coding transcodes (converts) the input to elements of a finite field $GF(q)$ (where q is a prime number or a power of a prime number), in which operations of a cryptographic algorithm (e.g., secret sharing) is performed. The result of the cryptographic algorithm, which contains elements of $GF(q)$, can be mapped directly to a transport-safe code for transporting via a communication protocol that is not safe for transporting binary values. For example, the input data stream can be transcoded into a polynomial over $GF(67)$ if the subsequent cryptographic algorithm operates over $GF(67^n)$. After the cryptographic function is performed, the output (which is still a set of integers in the range 0-66) can be mapped into a transport character set of 67 characters. By contrast, if a standard transport coding (e.g., base-64) is used, additional conversions would be needed for transmission (as well as reception) of the data stream. With base-64 coding, the input would first have to be transcoded to a polynomial over GF(67) for the cryptographic operations. The result of the cryptographic operations would have to be converted back to a binary form, which is then transcoded to base 64 for transport.

In one embodiment where the output data stream consists of a sequence of elements from a set of q printable characters, the base q may be a prime number or a power of a prime less than 94, e.g., q may be any of the following numbers: 2, 3, 4, 5, 7, 8, 9, 11, 13, 16, 17, 19, 23, 25, 27, 29, 31, 32, 37, 41, 43, 47, 49, 53, 59, 61, 64, 67, 71, 73, 79, 81, 83, and 89. The number 94 comes from the fact that there are 94 printable characters (such as, for example, ASCII characters). With an appropriate choice of the base q, the index values generated in the transport-safe coding can be used as the coefficients of a polynomial that represents the secret over GF(q), and the shares (containing elements of GF(q)) generated from the secret can be directly used for transport. Thus, when the secret sharing is used in tandem with the transport-safe coding, the prime number or prime power q that constructs GF(q) for secret sharing is often chosen to be the same as the base q for the transport-safe coding.

However, it is understood that the secret sharing described herein does not need to be combined with transport-safe coding. In a scenario where the secret sharing technique is not used with transport-safe coding or binary coding, the secret can be represented as a polynomial over GF(p), where p can be any prime number and of a size that is reasonable for the size of the secret to be shared.

Figure 2:
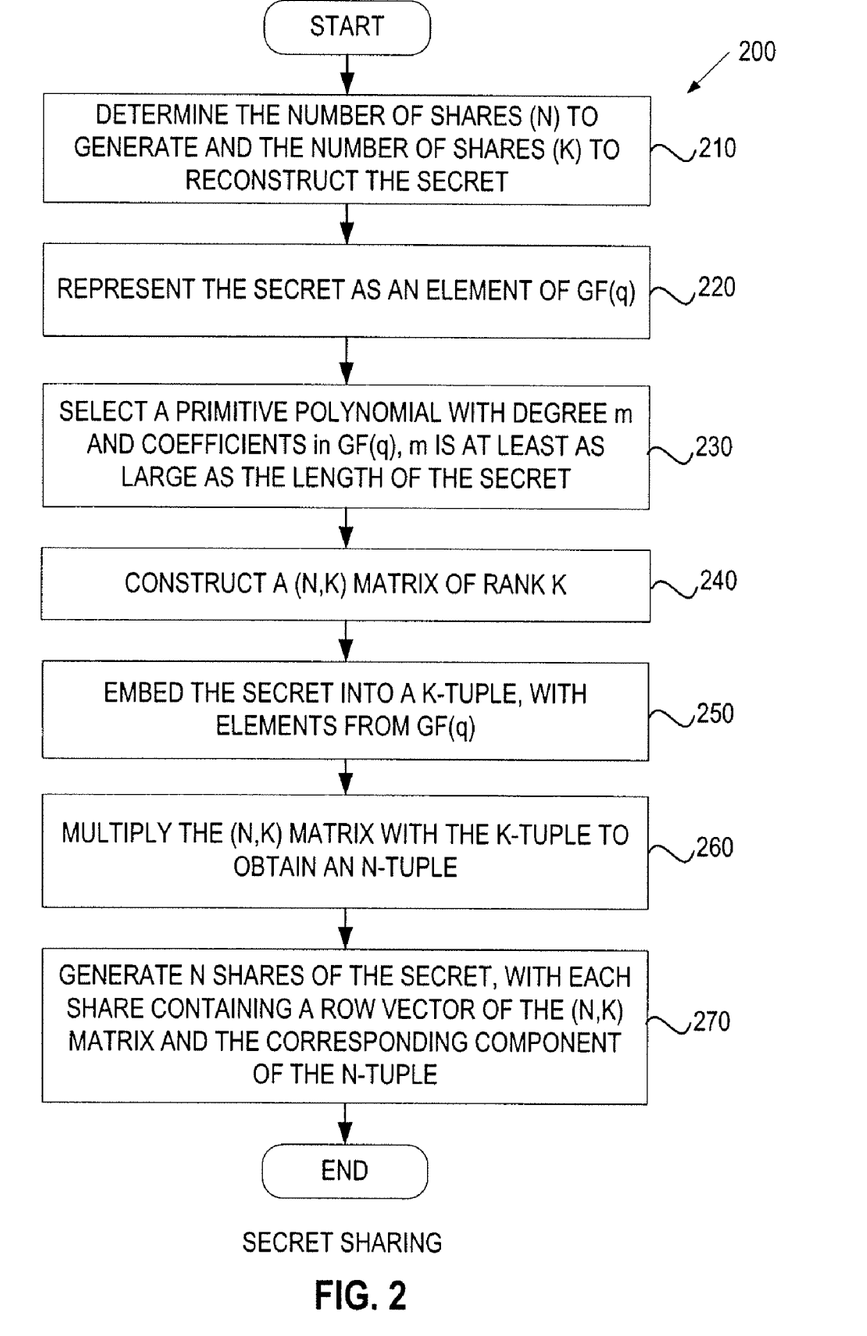
FIG. 2 is a flow diagram of a secret sharing method according to one embodiment of the present invention.

FIG. 2 illustrates a flow diagram of one embodiment of a method 200 for generating a plurality of shares from a secret (e.g., the secret 106). The method 200 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1.

Referring to FIG. 2, at block 210, the method 200 begins with the distributor 103 determining the total number (N) of shares to be generated and the number (K) of shares for reconstruction. Alternatively, the determination may be made by a user or an administrator of the distributor 103, based on the available computing or storage resources and the available number of recipients 101 that can jointly hold the shares of the secret. At block 220, if the secret is stored in a format other than an element of GF(q), the distributor 103 converts the secret into an element of GF(q). The distributor 103 converts the secret into a secret polynomial=$c_0+c_1x+c_2x^2+ \ldots + c_{m-1}x^{m-1}$. Each of the coefficients in the sequence ($c_0, c_1, \ldots, c_{m-1}$) is an integer in the range of (0, p-1). The secret can be converted from its original format to the sequence of coefficients by a number of different techniques. For example, if the original secret is a decimal number, the sequence of coefficients ($c_0, c_1, c_{m-1}$) can be generated by repeatedly dividing the secret by p and retaining the reminders and the last quotient. If the original secret is a sequence of binary bit string, the sequence of coefficients ($c_0, c_1, \ldots, c_{m-1}$) can be generated by converting consecutive subsequences of the secret bit string individually. Illustratively, if p is 67, each 6 bits of the secret bit string can be grouped together to produce a coefficient that is less than 67. If p is 89, each 32 bits of the secret bit string can be grouped together to produce 5 elements of the output at a time (e.g., by repeatedly dividing the 32-bit value by 89 and retaining the remainders).

At block 230, the distributor 103 selects a primitive polynomial having degree m. A primitive polynomial over GF(p) of degree m is a polynomial with coefficients from GF(p) with roots in GF($p^m$), where each root is a primitive element of GF($p^m$). Such polynomials have characteristic properties that allow them to be identified (e.g., for a polynomial Pr of degree m, the smallest integer n that makes $x^n=1$ (modulo Pr) true is $p^m-1$). The primitive polynomial can be used to construct a representation of the field GF(q). The primitive polynomial will be used to perform modulo operations during the generation of shares.

Continuing to block 240, the random matrix generator 131 of the distributor 103 constructs a (N×K) matrix with N rows and K columns of random elements of GF(q). Each random element is a number sequence of length m. The (N×K) matrix has rank K; that is, the matrix has K linearly independent columns. As a matrix of size (N×K) can at most have K linearly independent columns, the matrix is said to have full rank or maximal rank. Two embodiments of generating a full rank matrix of size (N×K) will be described in greater detail with reference to FIGS. 5 and 6. In a first embodiment illustrated in FIG. 5, the random matrix generator 131 first populates the (N×K) matrix with random elements of GF(q), and then verifies the rank of the matrix. The matrix rank can be verified by reducing the matrix to an upper (or lower) triangular matrix of an equivalent rank. The reduction is performed by a sequence of multiply-and-subtract operations. In a second embodiment illustrated in FIG. 6, the random matrix generator 131 uses a sequence of multiply-and-add operations to generate a full-rank matrix of size (N×K) directly.

Continuing to block 250, the embedding unit 132 of the distributor 103 embeds the secret into a K-tuple. Each component of the K-tuple is an element of GF(q). In one embodiment, the embedding unit 132 generates (K−1) random elements of GF(q). One of the elements of the K-tuple (e.g., the last component) is the secret, which is augmented into a number sequence of length m (if its original length is less than m). For example, the number sequence may be augmented by pre-appending one or more elements of GF(p).

Continuing to block 260, the matrix multiplier 133 of the distributor 103 multiplies the (N×K) matrix generated at block 240 with the K-tuple generated at block 250. The K-tuple is represented as a (K×1) matrix for the multiplication. The multiplication is performed using arithmetic defined for elements of GF(q), modulo the primitive polynomial selected at block 230. The multiplication produces an N-tuple, with each component of the N-tuple an element of GF(q).

Continuing to block 270, the distributor 103 generates N shares of the secret, using the (N×K) matrix generated at block 240 and the N-tuple generated at block 260. Each share includes (K+1) components: K components come from one of the N rows of the (N×K) matrix, and an additional component comes from the corresponding component of the N-tuple (e.g., row R of the matrix and R-th component of the N-tuple). The (K+1) components of each share represent an equation for a K-dimensional hyperplane over GF(q). The distributor 103 then distributes the N shares and the method 200 terminates.

It is understood that the above operations can follow a different sequence from what is shown in FIG. 2. For example, the generation of the (N×K) matrix can be performed after the generation of the K-tuple. It is also understood that the row and column dimensions of the (N×K) matrix can be transposed as long as the corresponding matrix operations are transposed as well. Further, it is understood that equivalent operations can be performed without involving matrix operations. For example, the distributor 103 may generate N linear equations in K variables over $GF(2^m)$, and evaluate each of the equations at the secret K-tuple. This linear equation approach is equivalent to the operations in matrix form.

The computation performed by the above-described secret sharing technique uses modular arithmetic over small primes. That is, polynomial operations are performed on numbers in the range of (0, p−1) to generate a result less than p. It is not necessary to keep track of the carries during the computation, as the addition of two corresponding polynomial terms (the same degree terms) generates no carry to a term of a higher degree (that is, the addition of the constant terms does not carry over to the $1^{st}$ degree term, the addition of the $1^{st}$ degree terms does not carry over to the $2^{nd}$ degree terms, etc.). As a result, the computation can be efficiently run on constrained hardware (e.g., an embedded microcontroller), where at least some of the computation is handled by software. Software on the constrained hardware can be programmed to efficiently handle the computation of the polynomials, which involves single precision integer arithmetic over integers of a small size (limited by the size of p). If the embedded system is provided with sufficient memory (e.g., read-only memory) and the size of the base prime p is small, polynomial multiplications can be implemented with table lookups. For example, if p is 37, the lookup table size would be 37 by 37 (=1369). The polynomial operations defined on GF(q) can also be efficiently implemented in array processors for parallel processing. For example, multiplication of two polynomials can be implemented by processing elements of an array processor, each holding one coefficient of a first polynomial. Each time a processing element receives a coefficient of a second polynomial, it performs a multiply-and-add operation over small integers. A person of ordinary skill in the art would appreciate that other embodiments may exist for processing arithmetic operations defined on GF(q).

Figure 3:
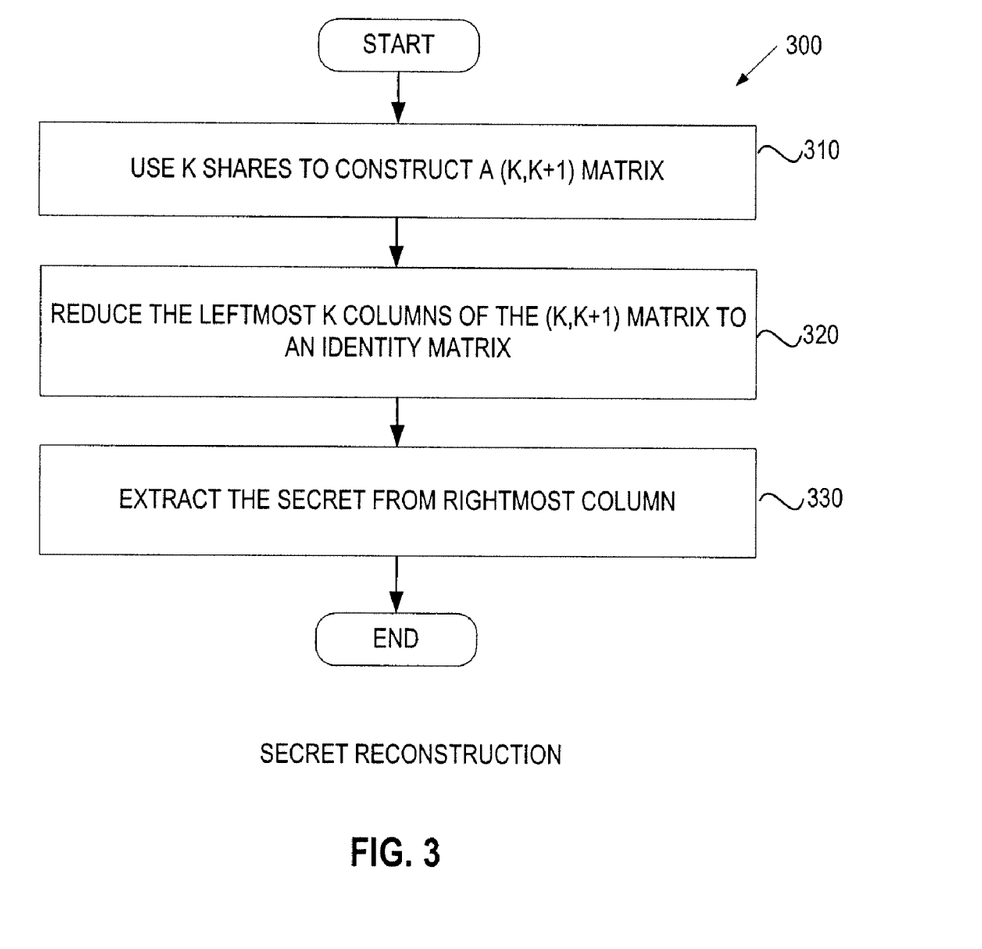
FIG. 3 is a flow diagram of a secret reconstruction method according to one embodiment of the present invention.

FIG. 3 illustrates a flow diagram of one embodiment of a method 300 for reconstructing the secret from a subset of the distributed shares. The method 300 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 300 is performed by the reconstructor 104 of FIG. 1.

Referring to FIG. 3, at block 310, the method 300 begins with the reconstructor 104 collecting K of the N distributed shares from the recipients 101. Each of the K shares is placed in a separate row to form a (K, K+1) matrix. At block 320, the matrix converter 141 converts the leftmost K columns of the (K, K+1) matrix into an identity matrix. An identity matrix has identity elements (e.g., 0001 in $GF(p^4)$) along the diagonal and zeros elsewhere. The conversion can be performed by a sequence of multiplications and additions. After the conversion, the rightmost column of the (K, K+1) matrix is the K-tuple generated at block 250 of FIG. 2. The reconstructor 104 may have communicated with the distributor 103 with respect to recovery of the secret from the K-tuple (e.g., the location of the secret in the K-tuple). At block 330, the reconstructor 104 extracts the secret from the K-tuple in the rightmost column of the converted matrix. The method 300 then terminates.

Having described the techniques for share generation and reconstruction, the following descriptions explain, in detail, embodiments of techniques for generating a full rank matrix (which are the operations performed at block 240 of FIG. 2), and for converting a matrix into an identity matrix (which are the operations performed at block 320 of FIG. 3).

Figure 4A:
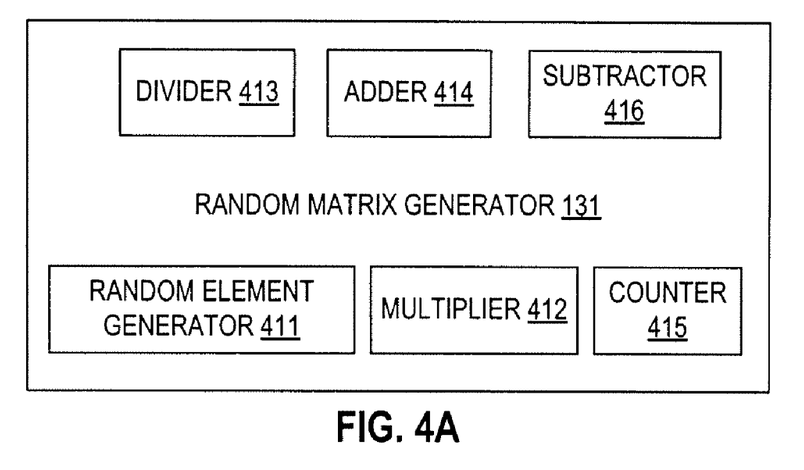
FIG. 4 illustrates a block diagram of one embodiment of a random matrix generator for generating shares and a matrix converter for secret reconstruction.

FIG. 4A illustrates an exemplary system of the random matrix generator 131 (of FIG. 1) that generates a full rank matrix (N×K). In the embodiment of FIG. 4A, the random matrix generator 131 includes a random element generator 411 to generate random elements of GF(q), a multiplier 412 to multiply elements of GF(q), a divider 413 to divide elements of GF(q), an adder 414 to perform addition, a subtractor 416 to perform subtraction, and a counter 415 to keep track of the progress of the computation.

Figure 4B:
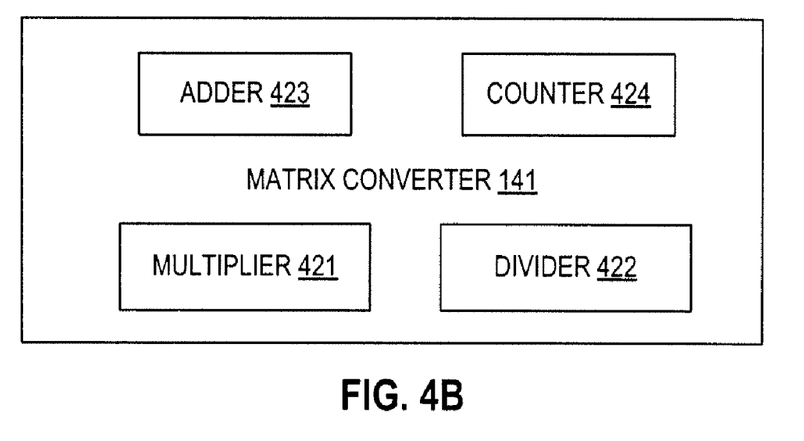

FIG. 4B illustrates an exemplary system of the matrix converter 141 (of FIG. 1) that converts a given matrix into an identity matrix. In the embodiment of FIG. 4B, the matrix converter 141 includes a multiplier 421 to multiply elements of GF(q), a divider 422 to divide elements of GF(q), an adder 423 to perform addition, and a counter 424 to keep track of the progress of the computation.

Figure 5:
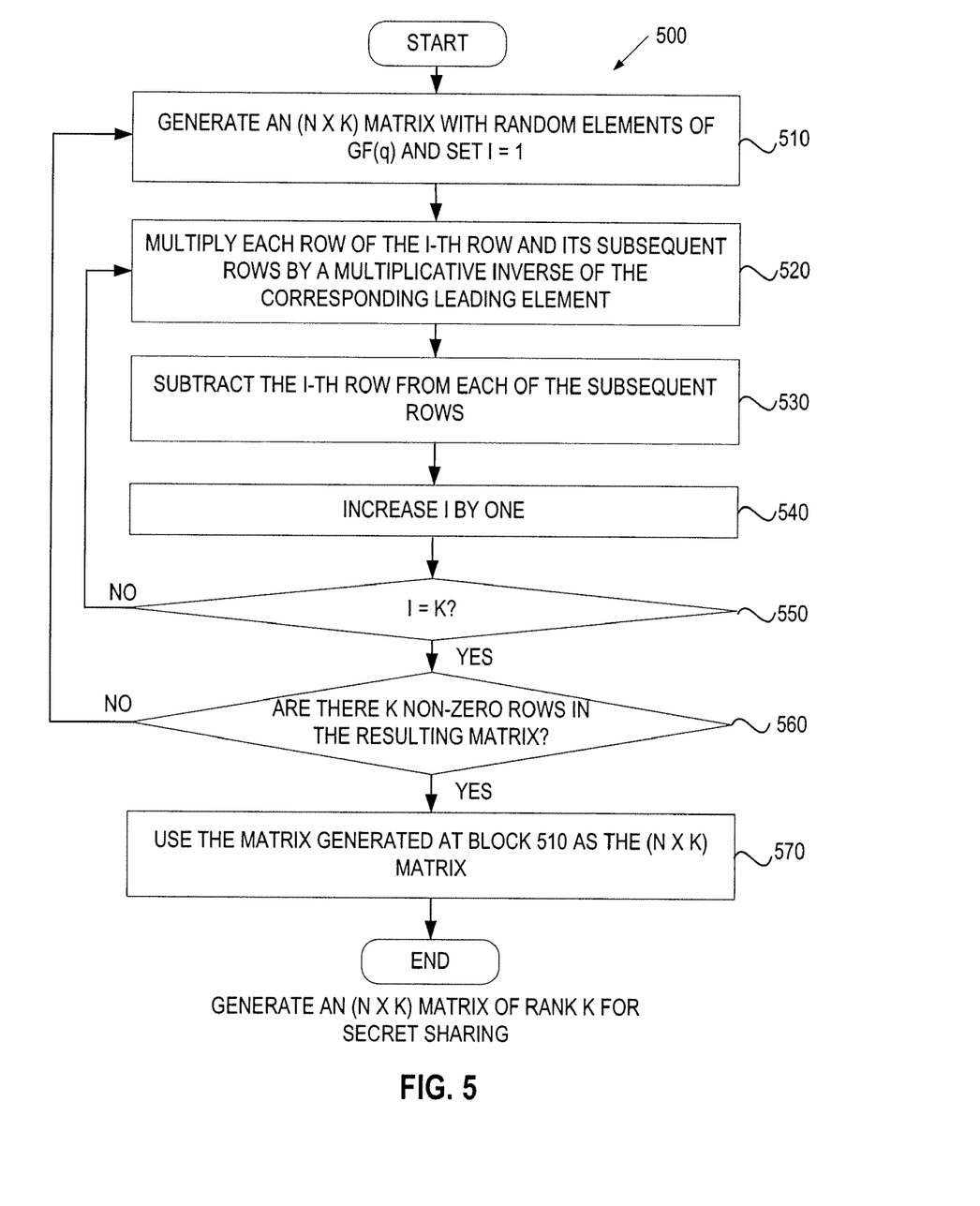
FIG. 5 illustrates a flow diagram of one embodiment of a method for generating a full rank random matrix for secret sharing.

FIG. 5 illustrates a flow diagram of a first embodiment of a method 500 for generating a full rank matrix. The method 500 can be applied to a matrix of any size, including a rectangular matrix and a square matrix. The method 500 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 500 is performed by the random matrix generator 131 of FIG. 1 and FIG. 4A.

Referring to FIG. 5, at block 510, the random element generator 411 of the random matrix generator 131 generates an (N×K) matrix with random elements of GF(q). After the generation of the matrix, the random matrix generator verifies the rank of the matrix. To verify that the rank of the matrix is K, the random matrix generator 131 performs a sequence of row operations to reduce the matrix into an upper triangular matrix (i.e., a matrix with all of its elements below the diagonal being zero). The verification process starts with setting the value I of the counter 415 to one. The value I indicates the row number being processed. At block 520, the multiplier 412 multiplies each of the I-th row and the rows below the I-th row by a multiplicative inverse of its non-zero leading term. The multiplicative inverse of a term 'A' can be computed by solving the expression Ax+fy=i, where f is the primitive polynomial that generates GF(q), i is the multiplicative identity of GF(q) (e.g., 0001 for $GF(p^4)$) and x is the multiplicative inverse of A. A known technique for solving the above expression is the extended Euclidean algorithm, which is an iterative algorithm that includes a sequence of division (performed by the divider 413), multiplication (performed by the multiplier 412) and subtraction (performed by the subtractor 416). Computing the multiplicative inverse in a finite field using the extended Euclidean algorithm is known in the art. Thus, the details of the computation are omitted to simplify the discussion.

After the rows (from I to N) are multiplied by a multiplicative inverse of its respective leading non-zero term, each of these rows has a non-zero leading term equal to the identity element of GF(q). At block 530, the subtractor 416 subtracts the I-th row from each of the subsequent rows. As each element of the rows is an element of GF(q), the subtractor 416 performs the subtraction using modulo p operations.

Proceeding to block 540, the counter 415 increases the counter value I by one to process the next row. If the counter value I is equal to K at block 550, the method 500 proceeds to block 560. If, at block 550, the counter value I is less than K, the operations at blocks 520-540 are repeated until I=K, and the method 500 proceeds to block 560.

At block 560, the random matrix generator 131 determines whether there are K non-zero rows in the resulting matrix. If it is determined that there are K non-zero rows in the resulting matrix, the rank of the matrix is K, and the method 500 proceeds to block 570. If it is determined that there are fewer than K non-zero rows in the resulting matrix, the rank of the matrix is less than K. Thus, the operations at blocks 510-560 are repeated until a matrix of rank K is generated and the method 500 proceeds to block 570. At block 570, it has been verified that the matrix generated at block 510 has rank K and can be used as the (N×K) matrix for generating shares of a secret. The method 500 then terminates.

Figure 6:
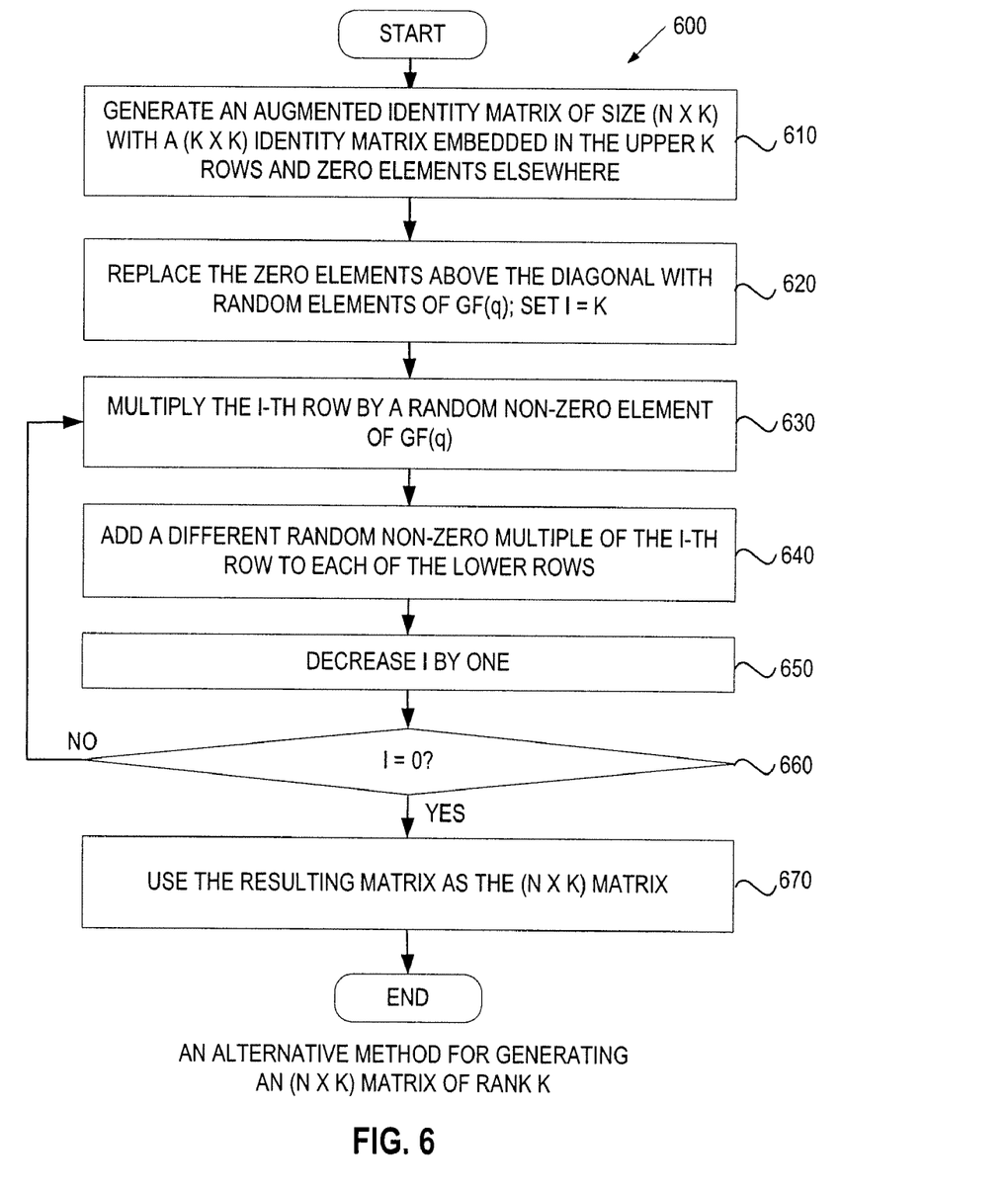
FIG. 6 illustrates a flow diagram of an alternative embodiment of a method for generating a full rank random matrix for secret sharing.

FIG. 6 illustrates a flow diagram of a first embodiment of a method 600 for generating a full rank matrix. The method 600 can be applied to a matrix of any size, including a rectangular matrix and a square matrix. The method 600 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 600 is performed by the random matrix generator 131 of FIG. 1 and FIG. 4A.

Referring to FIG. 6, at block 610, the random matrix generator 131 generates an augmented identity matrix of size (N×K), with a (K×K) identity matrix embedded in the upper rows and zero elements above and below the diagonal. An identity matrix is a matrix that has the identity element of GF(q) as the diagonal elements. At block 620, the random element generator 411 of the random matrix generator 131 generates non-zero random elements of GF(q) and replaces the zero elements above the diagonal with the random elements. The random matrix generator 131 then starts to populate the matrix with non-zero random elements using a sequence of multiply and add operations. At this point, the value I of the counter 415 is set to K, which indicates the row number being operated on. At block 630, the multiplier 412 multiplies the I-th row by a non-zero random element of GF(q). At block 640, another non-zero random element of GF(q) is generated and multiplied with the I-th row. This random multiple of the I-th row is added, by the adder 414, to a row below the I-th row. The operation of block 640 is repeated for each of the rows below the I-th row, each time with a new non-zero random element generated and multiplied with the I-th row, and the resulting multiple of the I-row added to each of the rows below the I-th row.

At block 650, the counter value I is decreased by one. If, at block 660, the counter value I is equal to zero, the method 600 proceeds to block 670. Otherwise, the operations at blocks 630-650 are repeated until I=1, and the method 600 proceeds to block 670. At block 670, the resulting matrix is the rank K matrix of (N×K). The resulting matrix has the same amount of random information used in its construction as an (N×K) matrix generated by the method 500 of FIG. 5.

As an example, with N=3 and K=2, the sequence of operations for generating the resulting matrix according to the method 600 is shown below, where a, b, c, d, e, f are six random elements of GF(q) and i is the identity element of GF(q).

$$
\begin{matrix} i & a \\ 0 & i \\ 0 & 0 \end{matrix} \rightarrow \begin{matrix} i & a \\ 0 & b \\ 0 & 0 \end{matrix} \rightarrow \begin{matrix} i & a \\ 0 & b \\ 0 & bc \end{matrix} \rightarrow \begin{matrix} d & ad \\ 0 & b \\ 0 & bc \end{matrix} \rightarrow \begin{matrix} d & ad \\ de & b+ade \\ df & bc+adf \end{matrix}
$$

Figure 7:
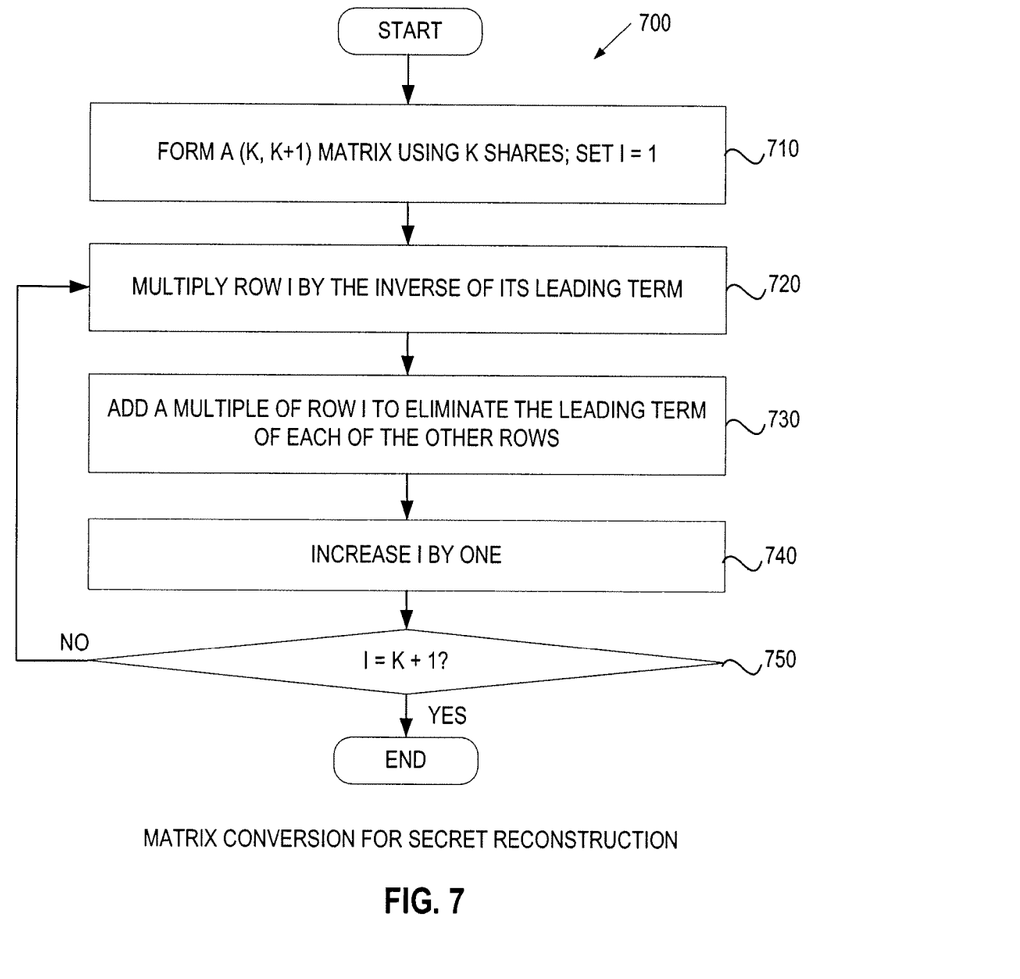
FIG. 7 a flow diagram of one embodiment of a method for converting a matrix of collected shares to extract the secret.

FIG. 7 illustrates a flow diagram of an embodiment of a method 700 for extracting the secret from the required shares (K). The method 700 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 700 is performed by the reconstructor 140 of FIG. 1 and FIG. 4B.

Referring to FIG. 7, at block 710, the reconstructor 140 forms a (K, K+1) matrix using K of the N distributed shares. The matrix converter 141 of the reconstructor 140 sets its counter 424 to one, which means row 1 is the current target row. At block 720, the matrix converter 141 computes the inverse of the leading term of the target row, and multiplies the target row by the computed inverse. At block 730, the matrix converter 141 adds an appropriate multiple of the target row to each of the other rows to eliminate the off-diagonal elements in the corresponding target column (e.g., if row 1 is the target row, the corresponding column is column 1). At block 740, the matrix converter 141 increments the counter 424 by one. Thus, the target column and row number is also incremented by one. At block 450, if the counter has not reached the last row (row N), the operations of blocks 420-440 are repeated until the last row is reached. When the method 700 ends, all the off-diagonal elements of the leftmost (K×K) portion of the matrix are eliminated. The rightmost column of the matrix is the ordered K-tuple that contains the secret as one of its components.

The following is an example of the secret sharing and reconstruction technique described above. In this example, the secret is an ASCHI code for the letter "A" (which is 65 in decimal representation), and the field GF(q) on which operations are defined is chosen to be $GF(7^3)$. The primitive polynomial is chosen to be $x^3+3x+2$. The secret "A" can be represented in the field of $GF(7^3)$ by successive division by 7: 65/7=9 with remainder 2, 9/7=1 with remainder 2. Thus, the secret can be presented in polynomial notion as $x^2+2x+2$, which can be more compactly represented as 122 (the three coefficients of the polynomial). As the order of the field $GF(7^3)$ is 3, each element of $GF(7^3)$ has 3 numbers in the range of (0, 6). In this example, it is assumed that an (N, K) scheme with N=4 and K=3 is used.

To embed the secret 122 in an ordered triplet, two random elements of $GF(7^3)$ are generated. Assume that the ordered triplet is (510, 341, 122), where the first two components are random values and the last component is the secret.

Continuing with the above example, a (4×3) matrix of elements of $GF(7^3)$ is generated with rank 3, which is equivalent to constructing 4 triplets of elements of $GF(7^3)$ such that none of them can be constructed as a linear combination of any less than three of the others. The rank of the matrix determines whether it is possible to reconstruct the original secret. If the rank is not equal to the number of required shares (K), the secret cannot be reconstructed.

Using the first embodiment of matrix generation illustrated in FIG. 6, a random matrix M of size (4×3) is generated with random elements of $GF(7^3)$. First, an initial matrix (which is an upper triangular matrix) is generated with identity elements on the diagonal, random elements of $GF(7^3)$ in the upper portion of the diagonal, and zeros in the lower portion of the diagonal. For example, the initial matrix may be generated as:

001 541 044
000 001 423
000 000 001
000 000 000

Beginning with the first non-zero row (the third row), and working upwards, the third row is multiplied by a random non-zero element of the field to produce a resulting row, and a random non-zero multiple of the resulting row is added to every lower row (the fourth row). Using the above matrix, the third row is first multiplied by 062 to produce a resulting row 000 000 062. Adding the resulting row multiplied by 343 to the fourth row yields the following matrix:

001 541 044
000 001 423
000 000 062
000 000 205

Proceeding upwards to the second row, the second row is multiplied by 442 to produce a resulting row 000 442 130. Adding the resulting row times 435 to the third tow and adding the resulting row times 254 to the fourth row yield the following matrix:

001 541 044
000 442 130
000 613 230
000 231 134

Proceeding upwards again to the first row, the first row is multiplied by 546 to produce a resulting row. Adding multiples of 300, 261 and 364 to the second, third and fourth rows, respectively yields the following matrix M:

546 453 115
144 550 021
440 141 663
313 055 346

A person of ordinary skill in the art would recognize from the construction that the matrix produced by the above operations has rank 3. It is understood that the first embodiment illustrated in FIG. 5 can also be used to generate a random matrix. Both embodiments of FIG. 5 and FIG. 6 use the same amount of random information in generating the (N×K) matrix. In the above example, three random values are generated in the initial matrix, and then two, three and four values are generated for each successive group of row operations. The total number of random values, 12, is the same as generating a matrix of (4×3) random elements directly.

Continuing with the above example, the (4×3) matrix M is multiplied by the ordered triplet (expressed as a 3×1 matrix) to produce four quadruplets as (546, 453, 115, 460), (144, 550, 021, 145), (440, 141, 663, 643), and (313, 055, 346, 340). These four quadruplets are the four shares of the secret.

Reconstructing the secret involves constructing a (3, 4) matrix from the given shares, and reducing the leftmost three columns to a (3×3) identity matrix using row operations. As a result, the secret ordered triplet will be the far rightmost column. For example, using the first three shares, the following matrix can be constructed:

546 453 115 460
144 550 021 145
440 141 663 643

Reducing the first column yields:

001 541 044 360
000 442 130 256
000 613 230 435

The matrix above matches the second to last matrix during the construction of the original (4×3) matrix M for secret sharing. Continuing with reducing the second column yields:

001 000 534 313
000 001 423 641
000 000 062 056

The first row of the matrix above does not match the corresponding matrix during the construction of matrix M. Finally, reducing the third column yields the following matrix, the rightmost column of which is the triplet that embeds the secret 122.

001 000 000 510
000 001 000 341
000 000 001 122

Figure 8:
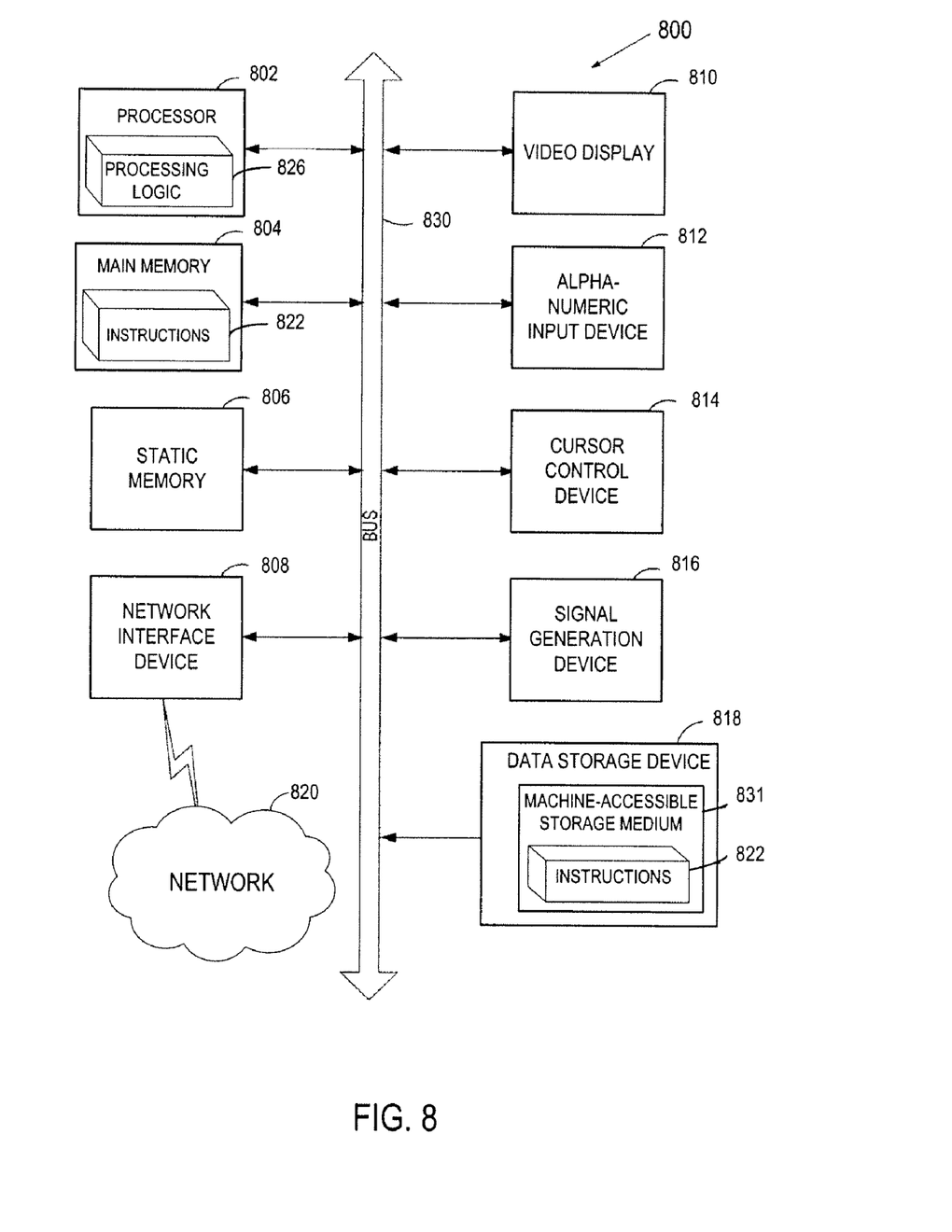
FIG. 8 illustrates a block diagram of an exemplary computer system implementing some embodiments of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

The machine-readable storage medium 831 may also be used to store the secret 106 of FIG. 1. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret using hyperplanes over GF(q) have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for distributing a secret, the method comprising:
   constructing a K-tuple that contains the secret and elements of GF(q), wherein K is the number of shares necessary for secret reconstruction and q is a power m of an odd prime p;
   multiplying, by a processor, the K-tuple by a matrix of size (N×K) to produce an N-tuple using arithmetic defined on GF(q), wherein N is the number of shares to be generated and N is greater than K; and
   generating N shares of the secret for distribution among cooperating entities,
     wherein generating N shares of the secret further comprises forming each of the N shares by including a row of the (N×K) matrix and a corresponding component of the N-tuple in each of the N shares, and
     wherein each share represents an equation for a K-dimensional hyperplane over GF(q).

2. The method of claim 1, further comprising:
   converting the secret into a sequence of coefficients of a secret polynomial for constructing the K-tuple, each coefficient being associated with one of q printable characters used in a base-q coding scheme.

3. The method of claim 1, further comprising:
   determining a primitive polynomial with degree m and coefficients in GF(p); and
   computing the N shares of the secret using arithmetic defined on GF(q), modulo the primitive polynomial.

4. The method of claim 1, wherein constructing a K-tuple further comprises:
   generating (K−1) random elements of GF(q) as (K−1) components of the K-tuple; and
   using the secret, represented as an element of GF(q), as one component of the K-tuple.

5. The method of claim 1, wherein multiplying the K-tuple by a matrix further comprises:
   generating a matrix containing (N×K) random elements of GF(q); and
   verifying that the rank of the matrix is K by a sequence of multiply and subtract operations applied to sub-matrices of the matrix, wherein the multiply includes multiplying a row by a multiplicative inverse, in GF(q), of a leading term of the row.

6. The method of claim 1, wherein multiplying the K-tuple by a matrix further comprises:
   generating a matrix of size (N×K) having identity elements as diagonal elements, zeros below the diagonal elements, and random elements of GF(q) above the diagonal elements;
   multiplying a target row by a non-zero random element of GF($2^m$) to produce a scaled target row; and
   for each row lower than the target row, adding a random multiple of the scaled target row to the row.

7. A system for dividing a secret into a plurality of shares, the system comprising:
   data storage which stores the secret; and
   a computing entity coupled to the data storage which generates N shares of the secret for distribution among cooperating entities, the computing entity comprising:
     an embedding unit which constructs a K-tuple that contains the secret and elements of GF(q), wherein K is the number of shares for secret reconstruction and q is a power m of an odd prime p; and
     a matrix multiplier which multiplies the K-tuple by a matrix of size (N×K) using arithmetic defined on GF(q), wherein N is the number of shares to be generated and N is greater than K,
       wherein the N shares are generated by including a row of the (N×K) matrix and a corresponding component of the N-tuple in each of the N shares, and
       wherein each share represents an equation for a K-dimensional hyperplane over GF(q).

8. The system of claim 7, wherein the computing entity further comprises:
   a random matrix generator to generate the matrix having N rows and K columns of random elements of GF(q) and to verify that the rank of the matrix is K by a sequence of multiply and subtract operations applied to sub-matrices of the matrix, the random matrix generator comprising:
     a multiplier to multiply a row by a multiplicative inverse, in GF(q), of a leading term of the row; and
     a subtractor to subtract the row from each of its subsequent rows.

9. The system of claim 7, wherein the computing entity further comprises:
   a random matrix generator to generate the matrix of size (N×K) having identity elements as diagonal elements, zeros below the diagonal elements, and random elements of GF(q) as elements above the diagonal elements, the random matrix generator comprising:
     a multiplier to multiply a row by a random element of GF(q); and
     an adder to add a different random multiple of the row to each of its lower rows.

10. A non-transitory computer readable storage medium including instructions that, when executed by a processing system, cause the processing system to perform a method comprising:
   constructing a K-tuple that contains the secret and elements of GF(q), wherein K is the number of shares necessary for secret reconstruction and q is a power m of an odd prime p;
   multiplying, by a processor, the K-tuple by a matrix of size (N×K) to produce an N-tuple using arithmetic defined on GF(q), wherein N is the number of shares to be generated and N is greater than K; and generating N shares of the secret for distribution among cooperating entities,
   wherein generating N shares of the secret further comprises forming each of the N shares by including a row of the (N×K) matrix and a corresponding component of the N-tuple in each of the N shares, and
   wherein each share represents an equation for a K-dimensional hyperplane over GF(q).

11. The computer readable medium of claim 10, wherein the method further comprises:
   converting the secret into a sequence of coefficients of a secret polynomial, each coefficient being associated with one of q printable characters used in a base-q coding scheme.

12. The computer readable medium of claim 10, wherein multiplying the K-tuple by a matrix further comprises:
   generating a matrix containing (N×K) random elements of GF(q); and
   verifying that the rank of the matrix is K by a sequence of multiply and subtract operations applied to sub-matrices of the matrix, wherein the multiply includes multiplying a row by a multiplicative inverse, in GF(q), of a leading term of the row.

13. The computer readable medium of claim 10, wherein multiplying the K-tuple by a matrix further comprises:
   generating a matrix of size (N×K) having identity elements as diagonal elements, zeros below the diagonal elements, and random elements of GF(q) above the diagonal elements; and
   performing a sequence of multiply and add operations on rows of the matrix to generate the matrix of rank K.

* * * * *